United States Patent
Yokomine et al.

(10) Patent No.: US 10,203,162 B2
(45) Date of Patent: Feb. 12, 2019

(54) GEOTHERMAL HEAT EXCHANGER, LIQUID TRANSPORT PIPE, LIQUID RAISING PIPE, GEOTHERMAL POWER GENERATION FACILITY, AND GEOTHERMAL POWER GENERATION METHOD

(71) Applicant: JAPAN NEW ENERGY CO., LTD., Tokyo (JP)

(72) Inventors: Takehiko Yokomine, Kyoto (JP); Hideo Sakamoto, Tokyo (JP)

(73) Assignee: JAPAN NEW ENERGY CO., LTD., Tokyo (JP)

( * ) Notice: Subject to any disclaimer, the term of this patent is extended or adjusted under 35 U.S.C. 154(b) by 4 days.

(21) Appl. No.: 15/507,833

(22) PCT Filed: Aug. 31, 2015

(86) PCT No.: PCT/JP2015/074764
§ 371 (c)(1),
(2) Date: Mar. 1, 2017

(87) PCT Pub. No.: WO2016/035770
PCT Pub. Date: Mar. 10, 2016

(65) Prior Publication Data
US 2017/0292792 A1    Oct. 12, 2017

(30) Foreign Application Priority Data

Sep. 2, 2014 (JP) .................................. 2014-178474
Sep. 2, 2014 (JP) .................................. 2014-178475
Sep. 2, 2014 (JP) .................................. 2014-178476

(51) Int. Cl.
*F03G 7/04* (2006.01)
*F28D 7/06* (2006.01)
(Continued)

(52) U.S. Cl.
CPC ............... *F28D 7/106* (2013.01); *F03G 7/04* (2013.01); *F24T 10/17* (2018.05); *F28D 7/06* (2013.01);
(Continued)

(58) Field of Classification Search
CPC .. F24T 10/15; F28D 7/106; F28D 7/06; F28D 7/16; F28D 7/026; F28D 20/0052; F24J 3/083; Y02B 10/40; Y02B 30/547
(Continued)

(56) References Cited

U.S. PATENT DOCUMENTS 3,470,943 A * 10/1969 Huisen ...................... F03G 7/04
                                                    159/902
3,911,683 A * 10/1975 Wolf ....................... F28D 15/02
                                                    60/641.2
(Continued)

FOREIGN PATENT DOCUMENTS

JP          54-52349         4/1979
JP          1-119804         8/1989
(Continued)

OTHER PUBLICATIONS

Search Report issued in International Bureau of WIPO Patent Application No. PCT/JP2015/074764, dated Nov. 24, 2015.
(Continued)

*Primary Examiner* — Justin M Jonaitis
(74) *Attorney, Agent, or Firm* — Greenblum & Bernstein, P.L.C.

(57) ABSTRACT

To provide a geothermal heat exchanger with high thermal efficiency, which can reduce heat loss to a non-geothermal zone when high-temperature liquid heated in the deep underground is transported to the ground. The geothermal heat exchanger of the present invention includes a liquid transport pipe provided with a liquid lowering pipe to which a
(Continued)

heat exchange liquid which is pressurized and supplied, a liquid raising pipe which is disposed on the inside or outside side of the liquid lowering pipe and raises the heat exchange liquid which is descended to the geothermal zone, moved from the lower part and composed of the high-temperature liquid generated by which heat from the geothermal zone is supplied, and an outer thermal insulation layer which is provided on a part or the whole of the outside of the liquid transport pipe at least from the ground surface to the geothermal zone.

32 Claims, 12 Drawing Sheets

(51) Int. Cl.
*F28D 7/10* (2006.01)
*F28D 7/16* (2006.01)
*F24T 10/15* (2018.01)
*F24T 10/17* (2018.01)

(52) U.S. Cl.
CPC ............. *F28D 7/16* (2013.01); *F24T 10/15* (2018.05); *Y02E 10/125* (2013.01)

(58) Field of Classification Search
USPC .................................. 165/45, 104.19; 62/260
See application file for complete search history.

(56) References Cited

U.S. PATENT DOCUMENTS

| | | | | |
|---|---|---|---|---|
| 4,052,857 A | * | 10/1977 | Altschuler | F24T 10/17 60/641.2 |
| 4,142,108 A | * | 2/1979 | Matthews | F03G 7/04 290/1 R |
| 4,512,156 A | * | 4/1985 | Nagase | F24T 10/17 60/641.2 |
| 4,642,987 A | * | 2/1987 | Csorba | F24T 10/20 60/641.2 |
| 5,203,173 A | * | 4/1993 | Horton | F24T 10/17 60/641.2 |
| 5,706,888 A | * | 1/1998 | Ambs | F24J 3/081 165/103 |
| 5,816,314 A | * | 10/1998 | Wiggs | F24J 3/083 165/45 |
| 6,615,601 B1 | * | 9/2003 | Wiggs | F25B 13/00 62/235.1 |
| 6,789,608 B1 | * | 9/2004 | Wiggs | F28D 20/0052 165/45 |
| 2004/0129408 A1 | * | 7/2004 | Wiggs | F24T 10/15 165/45 |
| 2007/0023163 A1 | * | 2/2007 | Kidwell | F25B 30/06 165/45 |
| 2009/0126923 A1 | | 5/2009 | Montgomery et al. | |
| 2010/0089059 A1 | * | 4/2010 | Ferguson | F01K 7/16 60/653 |
| 2016/0209083 A1 | * | 7/2016 | Yu | F24J 3/084 |

FOREIGN PATENT DOCUMENTS

| | | |
|---|---|---|
| JP | 1-219223 | 9/1989 |
| JP | 5-505664 | 8/1993 |
| JP | 2000-161198 | 6/2000 |
| JP | 2001-279798 | 10/2001 |
| JP | 2002-13828 | 1/2002 |
| JP | 2003-35386 | 2/2003 |
| JP | 2009-47285 | 3/2009 |
| JP | 2011-52621 | 3/2011 |
| JP | 2013-164062 | 8/2013 |
| WO | 2011005075 A1 | 1/2011 |

OTHER PUBLICATIONS

Office Action issued in Australia Counterpart Patent Appl. No. 2015312919, dated Sep. 17, 2018.

* cited by examiner

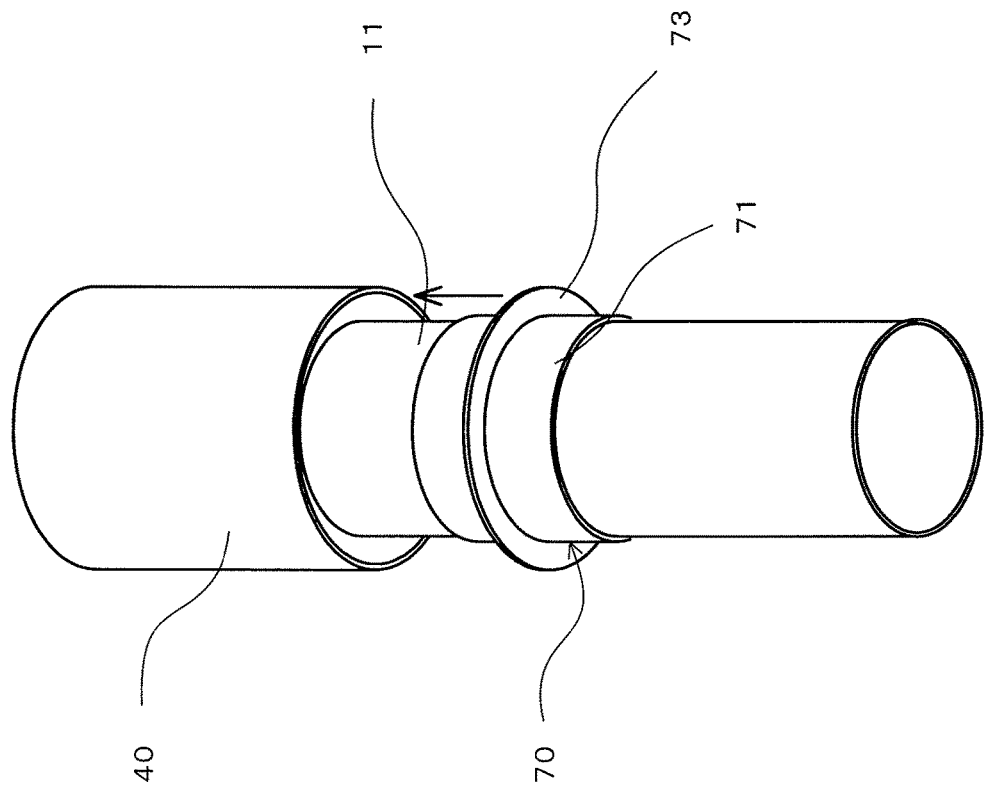
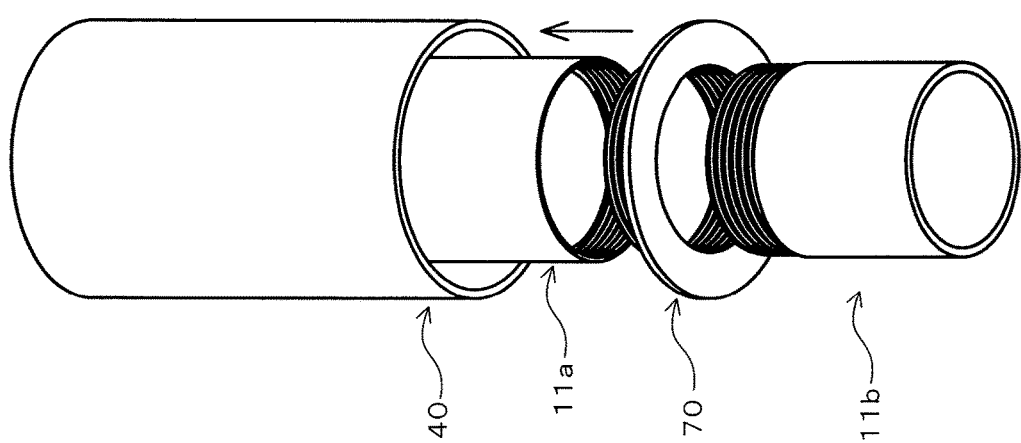

GEOTHERMAL HEAT EXCHANGER, LIQUID TRANSPORT PIPE, LIQUID RAISING PIPE, GEOTHERMAL POWER GENERATION FACILITY, AND GEOTHERMAL POWER GENERATION METHOD

TECHNICAL FIELD

The present invention relates to a geothermal heat exchanger, a liquid transport pipe, a liquid raising pipe, a geothermal power generation facility, and a geothermal power generation method.

BACKGROUND ART

The present inventors proposed a geothermal heat exchanger which comprises a liquid lowering pipe to lower a heat exchange liquid pressurized and supplied by a high-pressure liquid supply pump and a liquid raising pipe to raise the heat exchange liquid in a state without vapor heated by heat from a geothermal zone, feeds the heat exchange liquid extracted from the liquid raising pipe into a steam generator and extracts only steam therefrom. This geothermal heat exchanger is structured in such a manner that the liquid lowering pipe is disposed on the side of an outer circumference of the liquid raising pipe, and the heat exchange liquid is transported through introducing holes provided at a lower part of the liquid lowering pipe to the liquid raising pipe.

Such a geothermal heat exchanger is an effective invention because impurities do not adhere to the apparatus for the use of steam and a thermal-efficient heat exchange can be realized with very little influence on the environment in the vicinity of the geothermal zone since steam can be obtained from a hot liquid in a high temperature and a high pressure, extracted from the underground.

PRIOR ART DOCUMENT

Patent Document

Patent Document 1: Japanese Published Unexamined Patent Application No. 2013-164062

SUMMARY OF THE INVENTION

Problems to be Solved by the Invention

The object of the present invention is to further develop the heat exchanger according to the prior art and to provide a geothermal heat exchanger with a higher thermal efficiency.

Means to Solve the Problems

The present invention adopts the following means in order to attain the above object.

The geothermal heat exchanger according to the present invention is a geothermal heat exchanger installed in a geothermal zone, comprising:

a liquid transport pipe provided with a liquid lowering pipe which lowers a heat exchange liquid which is pressurized and supplied, and a liquid raising pipe which is disposed inside or outside of the liquid lowering pipe and raises the heat exchange liquid which is descended to the geothermal zone and heated by heat thereof, and an outer thermal insulation layer which is provided on a part or the whole of the outside of the liquid transport pipe at least from the ground surface to the geothermal zone.

The geothermal heat exchanger according to the present invention takes in the heat exchange liquid heated by the geothermal zone and is provided with the outer thermal insulation layer on a part or the whole of the outside of the geothermal heat exchanger from the ground surface to the geothermal zone so that the conduction of the heat to the underground when the heat exchange liquid passes a low-temperature non-geothermal zone can be prevented. Therefore, it is possible to reduce the heat loss to the non-geothermal zone during transporting the high-temperature heat exchange liquid heated in the deep underground to the ground so that a geothermal heat exchanger with a high thermal efficiency can be provided. In addition, it is possible to prevent the temperature decrease of the supplied heat exchange liquid if the temperature of the heat exchange liquid is higher than that of a non-geothermal zone.

Further, in the geothermal heat exchanger according to the present invention, the outer thermal insulation layer may be provided at least up to a point at which the temperature of the descending heat exchange liquid becomes equal to the temperature of the geothermal zone. The heat exchange liquid can receive the heat of the geothermal zone conversely at or below the point which the temperature of the descending heat exchange liquid is heated by the rising hot liquid and reached to the same temperature as the geothermal zone. Therefore, it is more efficient that there is no outer thermal insulation layer below the point. According to that, the outer thermal insulation layer is provided only above the point.

Further, in the geothermal heat exchanger according to the present invention, an outer thermal insulation pipe may be disposed outside of the liquid transport pipe, and the outer thermal insulation layer may be a space formed between the liquid transport pipe and the outer thermal insulation pipe. By adopting such a configuration, it is possible to provide a thermal insulation layer having various thermal insulation effects according to members inserted into the space between the liquid transport pipe and the outer thermal insulation pipe.

Further, in the geothermal heat exchanger according to the present invention, a gas of which pressure is 1.0 atm to 2.0 atm may be enclosed in the outer thermal insulation layer. The outer thermal insulation layer receives pressure from the heat exchange liquid flowing therein as well as the outer thermal insulation pipe receives geothermal pressure from the surrounding geothermal zone. Therefore, by pressurizing the inside of the outer thermal insulation layer, the thermal insulation layer can counteract each of the internal pressure and the external pressure. This makes it possible to reduce the thickness of the pipe to be installed. In this case, the pressurized gas to be sealed may be air or nitrogen gas. By adopting air or nitrogen gas, it becomes easier to adjust conditions of the outer thermal insulation layer such as temperature because the sealed gas can be replaced easily.

Further, in the geothermal heat exchanger according to the present invention, the outer thermal insulation layer may be formed with low-pressure or vacuum. This makes it possible to more effectively reduce the heat conduction loss from the liquid transport pipe to the underground.

Further, in the geothermal heat exchanger according to the present invention, a thermal insulation material may be enclosed in the outer thermal insulation layer. By adopting such means, it is possible to form the thermal insulation layer having various effects by selecting the thermal insulation material to be sealed.

Further, in the geothermal heat exchanger according to the present invention, the outer thermal insulation layer may be provided with a thermal insulation material which is directly provided on the outer periphery of the liquid transport pipe. By adopting such a configuration, it is possible to easily form the outer thermal insulation layer without forming a double-structure of the liquid transport pipe and the outer thermal insulation pipe. The means to cover the thermal insulation material is adopted, as a material of the outer thermal insulation layer. The means of the covering include lagging, spraying, coating of the thermal insulation material, and so on.

Further, in the geothermal heat exchanger according to the present invention, an inner thermal insulation layer may be provided between the liquid lowering pipe and the liquid raising pipe. Even if a thermal insulation pipe is used as a material for the liquid raising pipe, it is impossible to attain complete thermal insulation. In order to reduce the heat loss of the heat exchange liquid of rising hot liquid by the lowering heat exchange liquid, the inner thermal insulation layer is provided between them. As a result, it is possible to reduce the temperature decrease of the rising heat exchange liquid.

Further, in the geothermal heat exchanger according to the present invention, the inner thermal insulation layer may be formed between an inner thermal insulation pipe which is formed outside of the liquid raising pipe and the liquid raising pipe, and the inside of the inner thermal insulation pipe is formed with low-pressure or vacuum. In addition, a gas of which pressure is 1.0 atm to 2.0 atm may be enclosed in the inner thermal insulation pipe.

Further, in the geothermal heat exchanger according to the present invention, flanges may be provided on the outer periphery of the liquid transport pipe. By providing the flanges on the outer periphery of the liquid transport pipe, it is possible to make them function as support members to suppress the vibration of the liquid transport pipe, or to divide the outer thermal insulation layer formed of a single space into a plurality of spaces.

In addition, the geothermal power generation facility according to the present invention is characterized by using the geothermal heat exchanger described above and comprising a high-pressure pump, a steam generator, and a power generator. By adopting such a configuration, it is possible to provide a geothermal power generation facility having the same effects as described above.

Further, by using the geothermal power generation facility described above, it is possible to provide an efficient geothermal power generation method by steps of
(1) introducing a high-pressure heat exchange liquid into the geothermal heat exchanger by means of the high-pressure pump,
(2) extracting the heat exchange liquid heated by geothermal heat as in a single phase state while passing through the geothermal heat exchanger,
(3) obtaining steam by means of the steam generator from the geothermal heat exchanger to which the liquid is extracted, and
(4) rotating the turbine by the steam obtained by the steam generator.

In a liquid transport pipe installed in a geothermal zone according to the present invention, a liquid transport pipe used in a geothermal heat exchanger installed in a geothermal zone is characterized by comprising:

a liquid lowering pipe in which the pressurized heat exchange liquid is supplied and lowered;
a liquid raising pipe which is disposed inside or outside of the liquid lowering pipe and raises the descended heat exchange liquid, and
an outer thermal insulation layer which is provided on the outside of the liquid transport pipe.

The liquid transport pipe according to the present invention is a liquid transport pipe for manufacturing a closed-type heat exchanger where the heat exchange liquid does not contact directly with the geothermal zone until the heat exchange liquid is extracted after being heated by the geothermal zone, and it is possible to provide a liquid lowering flow region and a liquid rising flow region at least by the liquid raising pipe and the liquid lowering pipe. Moreover, since the outer thermal insulation layer is provided on the outside of this liquid transport pipe, it is possible to prevent diffusion of heat when the heat exchange liquid passes through a non-geothermal zone if the liquid transport pipe is disposed in the low-temperature non-geothermal zone. This makes it possible to reduce the heat loss to the non-geothermal zone when the heat exchange liquid heated in the deep underground is transported to the ground, which makes it possible to manufacture a geothermal heat exchanger with high thermal efficiency.

Further, in the liquid transport pipe according to the present invention, the outer thermal insulation layer may be provided with an outer thermal insulation pipe formed on the outside of the liquid transport pipe. When forming the outer thermal insulation layer, by the outer insulation pipe is formed to constitute a triple-pipe structure, a thermal insulation material can be inserted into the inside so that an effective thermal insulation effect can be exerted. In addition, by being manufactured so as to have hermeticity, it is possible to use a liquid thermal insulator. By forming the inside of the outer thermal insulation pipe with low-pressure or vacuum, it is possible to produce an effective thermal insulation effect, which leads to reduce the heat conduction loss from the liquid transport pipe to the underground. Also, a pressurized gas with 1.0 atm to 3.0 atm may be enclosed in the outer thermal insulation pipe. By adopting such a configuration, the liquid transport pipe receives the pressure from the heat exchange liquid flowing therein, and the outer thermal insulation pipe receives the geothermal pressure from the surrounding geothermal zone. However, by pressurizing the inside of the outer thermal insulation layer, it is possible to counteract the internal pressure or the external pressure. This makes it possible to reduce the thickness of the pipe to be installed. Air or nitrogen gas or the like can be used as the pressurized gas to be sealed at this time. By adopting air or nitrogen gas, the internal gas can be easily replaced so that temperature control and the like can be easily made. By adopting air or nitrogen gas having a specific heat lower than that of water, it is possible to prevent a sudden change of the temperature of the heat exchange liquid when circulating or replacing the internal gas, and therefore it is possible to suppress the change of the heat exchange liquid from the liquid single-phase state to the gas-liquid two-phase state. In this way, it becomes possible to select various kinds of thermal insulation methods by adopting the triple-pipe structure.

Further, in the liquid transport pipe according to the present invention, a thermal insulation material may be disposed on the outside of the pipe disposed inside which is either the liquid raising pipe or the liquid lowering pipe. The heat exchange between the descending heat exchange liquid and the ascending heat exchange liquid is suppressed by disposing the thermal insulation material on the pipe disposed on the inside. Therefore, it is possible to prevent the temperature of the rising heat exchange liquid from decreasing.

Further, in the liquid transport pipe according to the present invention, an inner thermal insulation pipe may be disposed on the outside of the pipe disposed inside which is either the liquid raising pipe or the liquid lowering pipe. The inside of the inner thermal insulation pipe can be either low-pressure or vacuum, or formed with a gas layer with 1.0 atm to 3.0 atm by insulating the outside of the pipe disposed inside as the inner thermal insulation pipe.

Further, in the geothermal heat exchanger according to the present invention, flanges may be provided on the outer periphery of the liquid transport pipe. By adopting such a configuration, it is possible to provide a thermal insulation layer further outside of the outer thermal insulation layer.

A liquid raising pipe according to the present invention is a part of a liquid transport pipe used in a geothermal heat exchanger installed in a geothermal zone, is disposed inside of a liquid lowering pipe for lowering a heat exchange liquid, and for raising the heat exchange liquid moved from the liquid lowering pipe through the opened lower end part, and a cutout portion is formed at the lower end part of the liquid raising pipe.

By adopting such a configuration, when the lowered heat exchange liquid moves to the liquid raising pipe to be raised, the fluid flow is lead to draw a spiral shape so that the generation of turbulence and irregular vortex can be prevented. Therefore, it is possible to prevent the fluid flow from being impeded by the friction loss.

Further, in the liquid raising pipe according to the present invention, the cutout portion may be formed so as to have a side having a gradient with respect to a horizontal plane of the liquid raising pipe. In order to rotate the heat exchanging liquid in the spiral shape efficiently, it is necessary that there is a difference in the positions through which the lowered liquid flows into the liquid raising pipe. Therefore, a side having the gradient is provided on the cutout portion.

Further, in the liquid raising pipe according to the present invention, the cutout portion may be formed so as to have a side perpendicular to the horizontal plane of the liquid raising pipe. If there are the gradients on the both sides, it may be occurred that liquids therefrom are flowed with rotating reversely to each other to cancel the power of their rotation. Therefore, by providing such that there is a perpendicular side, it is intended to minimize the formation of the flows rotating reversely as much as possible.

Further, in the liquid raising pipe according to the present invention, the cutout portion may be a right triangle. By making the cutout portion a right triangle shape, it is possible to spirally rotate the raising heat exchange liquid most efficiently.

Further, in the liquid raising pipe according to the present invention, the lower end part of the liquid raising pipe may have a ring-shaped member formed so as to bridge between the cutout portions. By adopting such a configuration, it is possible to reduce the possibility that the lower end part of the liquid raising pipe is broken or bent.

Further, in the liquid raising pipe according to the present invention, straightening plates may be provided on the outer periphery of the liquid raising pipe. By adopting such a configuration, it is possible to reduce the occurrence of turbulence and irregular vortex when the heat exchange liquid flows outside the liquid raising pipe, so that a smooth flow can be obtained.

Further, in the liquid raising pipe according to the present invention, the straightening plates may be provided parallel to the axial direction of the liquid raising pipe. In particular, by providing the straightening plates parallel to the axis of the liquid raising pipe at the place where turbulence and irregular vortex is likely to be occurred, it is possible to rectify the flow of the heat exchange liquid to the axial direction and make it smoother.

Further, in the liquid raising pipe according to the present invention, the straightening plates may be provided obliquely to the axial direction of the liquid raising pipe. By adopting such a configuration, it is possible to rotate spirally the lowering heat exchange liquid to prevent the generation of turbulence and irregular vortex. Therefore, it is possible to prevent the fluid flow from being impeded by the friction loss.

Further, in the liquid raising pipe according to the present invention, the straightening plates may function as supporting members to support the liquid lowering pipe. By adopting such a configuration, it is possible to fix the relative positions of the liquid raising pipe and the liquid lowering pipe to prevent occurrence of vibration.

Further, the present invention provides a liquid transport pipe which is provided with the liquid raising pipe and the liquid lowering pipe disposed outside of the liquid raising pipe, and the bottom surface part of the liquid lowering pipe is a hemispherical shape or a semi-elliptic spherical shape. By adopting such a configuration, it is possible to smoothly move the lowered heat exchange liquid to the liquid raising pipe.

BRIEF DESCRIPTION OF THE DRAWINGS

FIGS. 4A and 4B are perspective views which show a flange member for providing a flange to the liquid lowering pipe 11 of the geothermal heat exchanger 100 according to the first embodiment.

DESCRIPTION OF PREFERRED EMBODIMENTS

Embodiments of the geothermal heat exchanger 100, the liquid transport pipe 10, the liquid raising pipe 12, the geothermal power generation facility 110, and the geothermal power generation method according to the present invention will be described in detail with reference to the drawings. It should be understood that the embodiments and drawings described below exemplify a part of the embodiments of the present invention, are not intended to be used for the purpose of limiting to these configurations, and can be appropriately modified without deviating from the scope of the present invention. Throughout the drawings, the identical or similar reference signs are assigned to the corresponding constituent elements.

First Embodiment

Figure 1:
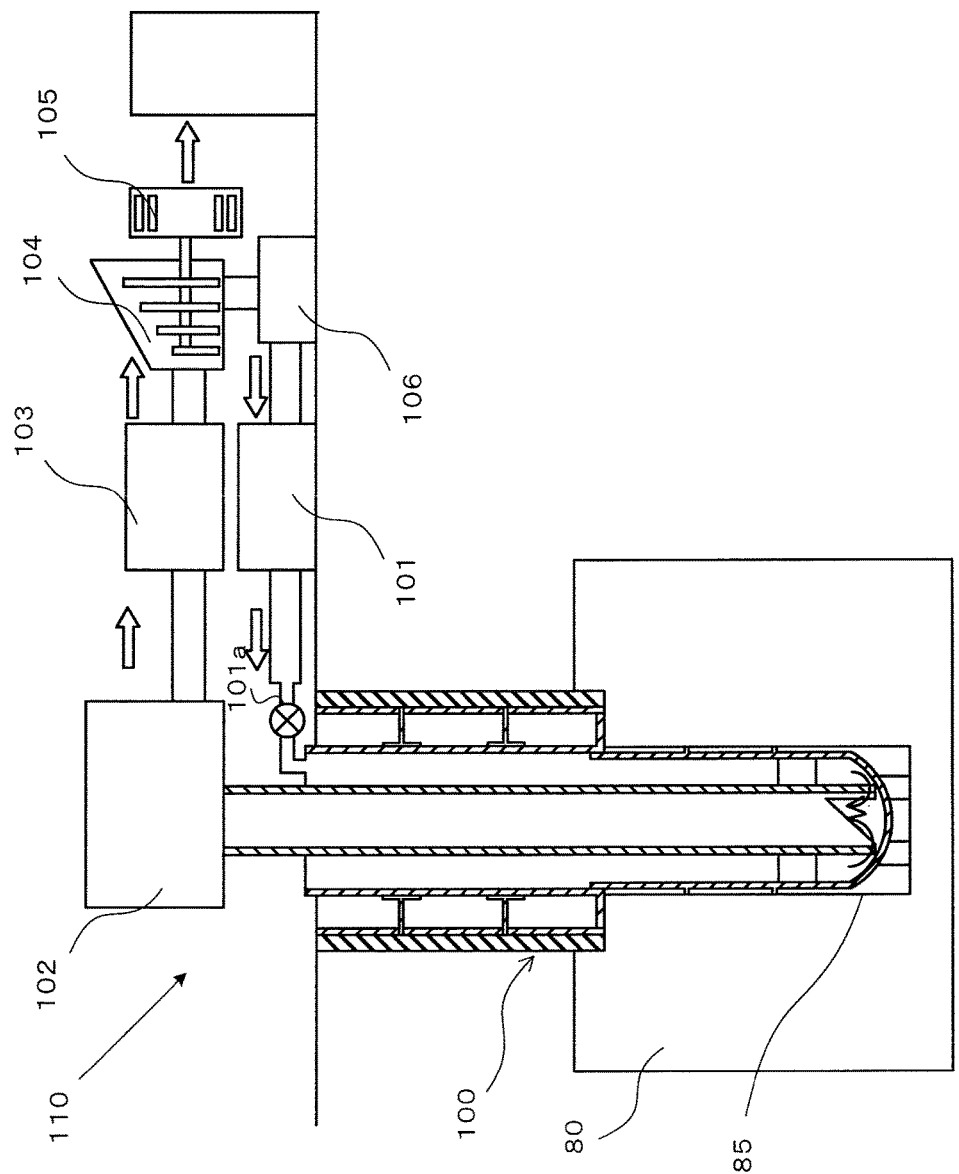
FIG. 1 is a schematic diagram which shows a geothermal power generation facility 110 according to a first embodiment.

The geothermal power generation facility 110 and the geothermal heat exchanger 100 according to the first embodiment will be described in detail with reference to FIG. 1 and FIG. 2. FIG. 1 is a schematic diagram which shows the geothermal power generation facility 110 according to the first embodiment, and FIG. 2 is a cross-sectional view which shows the geothermal heat exchanger 100 according to the first embodiment.

The geothermal power generation facility 110 according to the first embodiment mainly comprises of the geothermal heat exchanger 100, a high-pressure pump 101, a steam generator 102, a heater 103, turbines 104, a generator 105, a condenser 106, and the like. The geothermal power generation facility 110 according to present embodiment is a facility in which a heat exchange liquid is introduced into the geothermal heat exchanger 100 installed in a well 85 provided in a geothermal zone 80 by means of the high-pressure pump 101, the heat exchange liquid while flowing through the geothermal heat exchanger 100 is heated by receiving the heat from geothermal heat, and the electricity is generated by extracting the heat from the high-temperature heat exchange liquid. That is, the high-pressure heat exchange liquid is introduced into the geothermal heat exchanger 100, and steam is generated at the steam generator 102 by decompression boiling of the heat exchange liquid heated by geothermal heat after taken from the geothermal heat exchanger 100. If necessary, the generated steam is further heated by a heater 103 and introduced into the turbines 104 as high-temperature and high-pressure steam, and the generator 105 generates electricity by the rotation of the turbines 104. The steam consumed by the turbines 104 is condensed in the condenser 106, and the condensed heat exchange liquid is delivered to the high pressure pump 101 and receives geothermal heat again in the geothermal exchanger 100. As described above, the geothermal power generation facility 110 according to the present invention is a closed circulation type geothermal power generation facility in which the heat exchange liquid is circulated to extract the geothermal heat. It should be understood that the geothermal power generation facility 110 is not limited to the above-described configuration, and other constituent devices may be additionally provided.

Figure 2:
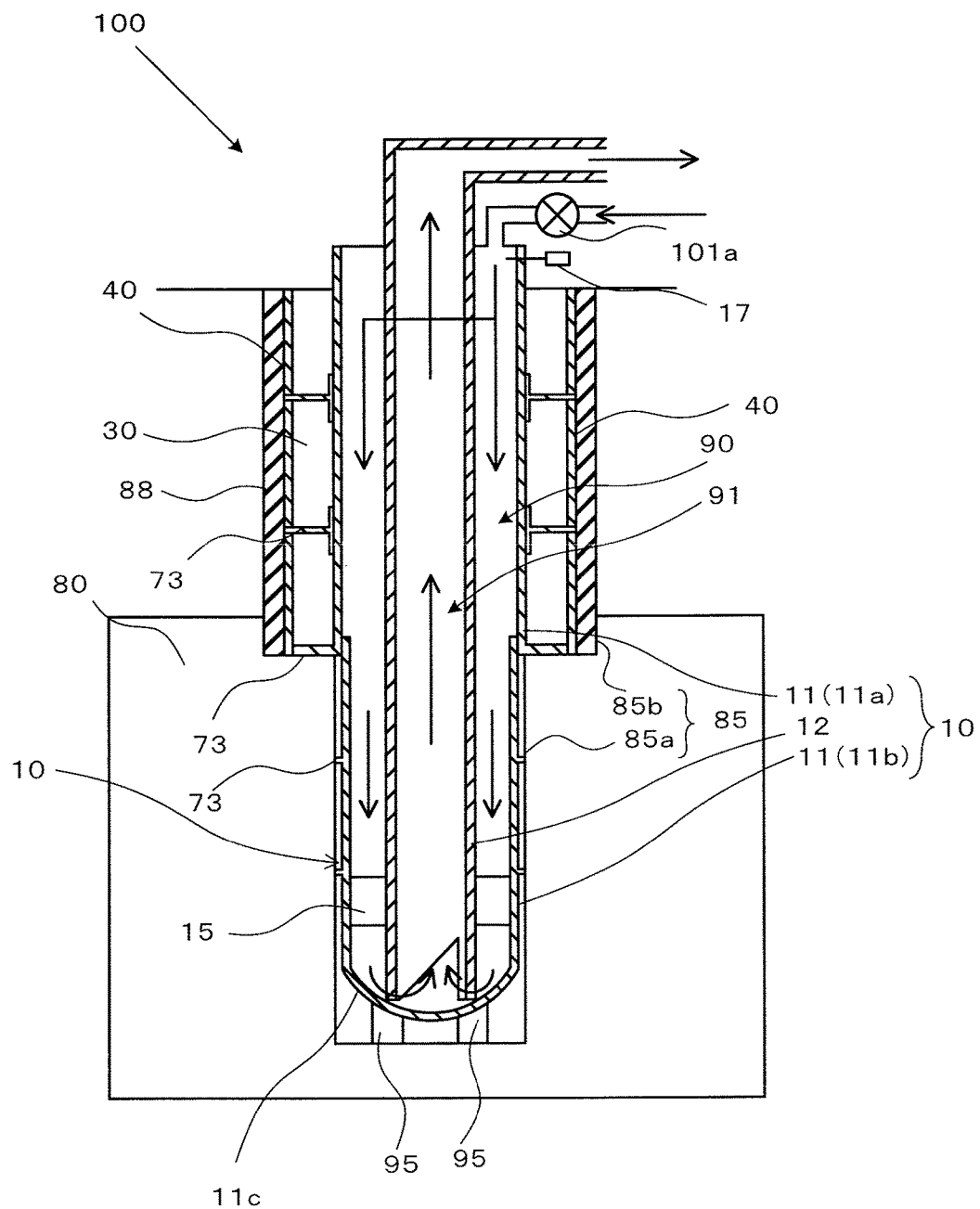
FIG. 2 is a cross-sectional view which shows a geothermal heat exchanger 100 according to the first embodiment.

As shown in FIG. 2, the geothermal heat exchanger 100 according to the first embodiment is mainly constituted by, in the non-geothermal zone, a triple-pipe structure, which includes a liquid transport pipe 10 having a liquid lowering pipe 11 and a liquid raising pipe 12, and an outer thermal insulation pipe 40 constituting an outer thermal insulation layer 30 disposed on the outside of the liquid transport pipe 10; and in the geothermal zone 80, a double-pipe structure, which includes only the liquid transport pipe 10 having the liquid lowering pipe 11 and the liquid raising pipe 12. Further, the geothermal heat exchanger 100 does not exclude to provide other means such as attaching a sensor 17 for measuring various data.

The liquid transport pipe 10 has a double-pipe structure by the liquid raising pipe 12 disposed inside and the liquid lowering pipe 11 disposed outside. The space formed between the liquid raising pipe 12 and the liquid lowering pipe 11 functions as a liquid lowering flow region 90 for transporting the heat exchange liquid from the ground to the geothermal zone 80, while the space inside the liquid raising pipe 12 corresponds to a liquid rising flow region 91 in which the heated heat exchange liquid is returned to the ground. The lower end part of the liquid lowering pipe 11 is formed to be closed and the lower end of the liquid raising pipe 12 is formed to be opened. At the lowest end part of the liquid transport pipe 10, the liquid lowering flow region 90 and the liquid rising flow region 91 are communicated with each other, and the heat exchange liquid is lowered while being heated in the liquid lowering flow region 90, introduced into the liquid raising pipe 12 at the lowest end part, and then raised and transported to the ground through the liquid rising flow region 91.

The liquid lowering pipe 11 is manufactured by connecting a plurality of pipes. As to pipes to be used, in addition to metal pipes such as oil well pipes, other pipes such as of a ceramic-based composite material or a carbon-based material can be used. Different materials may be used for the upper liquid lowering pipe 11a disposed above the geothermal zone 80 and the lower liquid lowering pipe 11b disposed in the geothermal zone 80. Since the lower liquid lowering pipe 11b receives heat from the geothermal zone, in order to increase the heat transfer surface, it may be possible to make the surface of the pipes uneven or to plate or spray the metal such as copper thereon.

Figure 3:
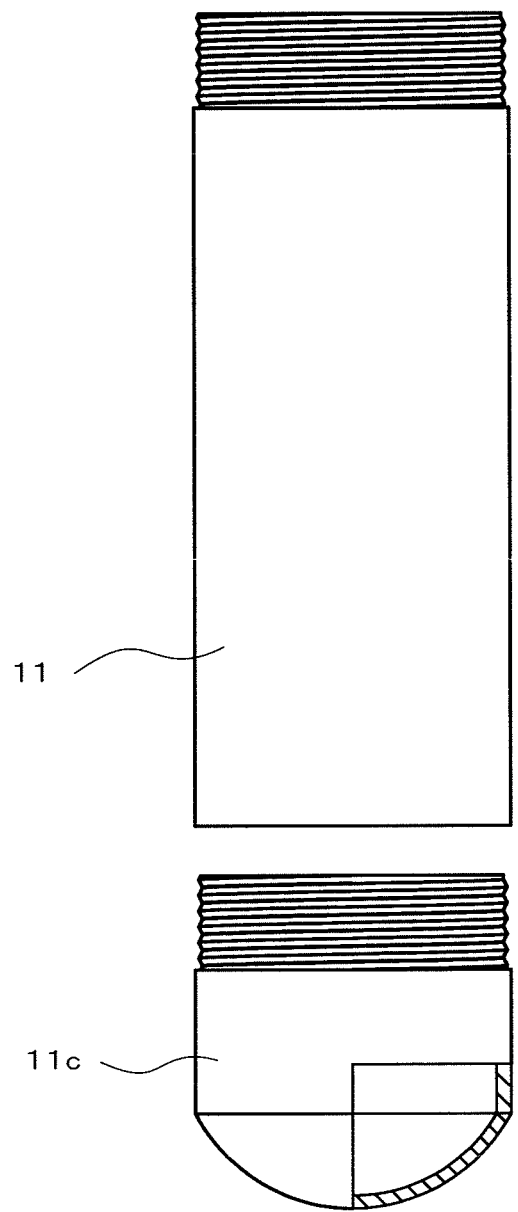
FIG. 3 is a side view which shows a liquid lowering pipe 11 of the geothermal heat exchanger 100 according to the first embodiment.

As shown in FIG. 3c, the lower end liquid lowering pipe 11c disposed at the lowest end of the liquid lowering pipe 11 is formed with the lower end part closed. It is preferable that the lower end face is formed like a hemisphere or semi-ellipsoid sphere to flow the heat exchange liquid smoothly into the liquid raising pipe 12.

As shown in FIG. 2, at the lower end part of the upper liquid lowering pipe 11a, a flange 73 is provided at the boundary between the triple-pipe structure and the double-pipe structure, and the outer thermal insulation layer 30 which is formed by the outer thermal insulation pipe 40 and the liquid lowering pipe 11a, is sealed by the flange 73. Thus, it is possible to prevent water or other substances from entering the outer thermal insulation layer 30 from the geothermal zone 80 or a place other than the geothermal zone 80. As a method for providing the flange 73, as shown in FIG. 4A, at a connecting position of the liquid lowering pipe 11 where the flange 73 is desired to be installed, the flange 73 can be installed between the upper liquid lowering pipe 11a and the lower liquid lowering pipe 11b by means of a flange member 70 in which the flange 73 is formed and can be sandwiched therebetween. Further, as shown in FIG. 4B, if the installation position is not a connecting position of the liquid lowering pipe 11, a flange 73 can be installed by means of a flange member 70 in which the flange 73 is formed at the a cylindrical fitting portion 71 which can be fitted to the outer periphery of the liquid lowering pipe 11. Also, a flange 73 may be simply welded to the liquid lowering pipe 11. As shown in FIG. 2, the flanges 73 can also be installed in the middle of the upper liquid lowering pipe 11a and the lower liquid lowering pipe 11b by adjusting the size of the flanges. By installing the flanges 73 in the middle of the upper liquid lowering pipe 11a, it is possible to divide the outer thermal insulation layer 30 into a plurality of sections, and even if a part of the pipe constituting the outer thermal insulation layer 30 is broken, the remaining outer thermal insulation layers can be held. In addition, by providing the flanges 73, these flanges have a positioning function of the liquid transport pipe 10 to suppress the vibration due to liquid flow and so on of both the upper and lower liquid lowering pipes 11.

The liquid raising pipe 12 is a pipe-like member disposed inside the liquid lowering pipe 11, and is formed by connecting a plurality of pipes in the same manner as the liquid raising pipe 12. While the material of pipes may be metals, it is preferable to use resin pipes with high thermal insulation performance so as to prevent the heat received by the geothermal zone 80 from being lost to the outside. For example, polyimide pipes, Teflon (registered trademark) pipes, Kevlar (registered trademark) pipes, fluororesin pipes, or the like can be used.

It is preferable to provide the cross-sectional area of the liquid rising pipe 12 (the cross-sectional area of the liquid rising flow region 91) so as to be equal to or smaller than the cross-sectional area of the liquid lowering flow region 90 (the cross-sectional area obtained by subtracting the cross-sectional area of the liquid raising pipe 12 from the cross-sectional area of the liquid lowering pipe 11). By adopting such a configuration, it is possible to shorten the time for flowing through the liquid rising flow region 91 by increasing the flow velocity of the rising heat exchange liquid with respect to the flow velocity of the lowering heat exchange liquid; consequently, the heat loss from the rising heat exchange liquid can be reduced.

Figure 5:
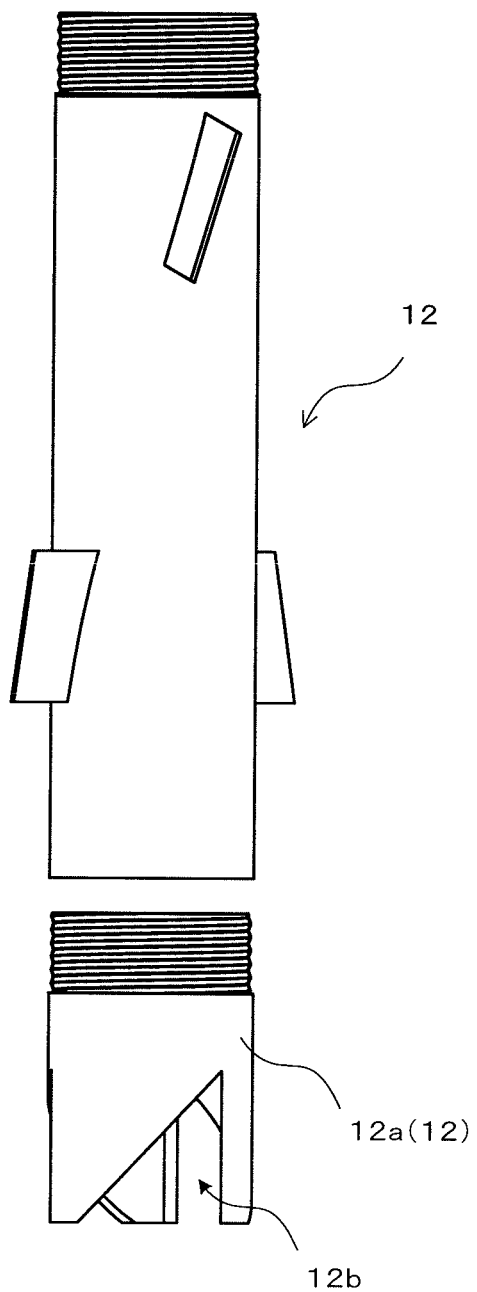
FIG. 5 is a side view which shows a liquid raising pipe 12 of the geothermal heat exchanger 100 according to the first embodiment.
Figure 6A:
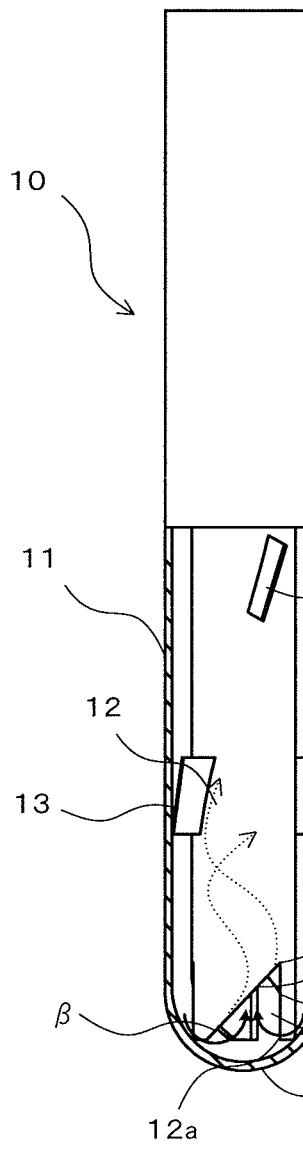
FIG. 6A is a partial cross-sectional view of a liquid transport pipe according to the first embodiment.
Figure 6B:
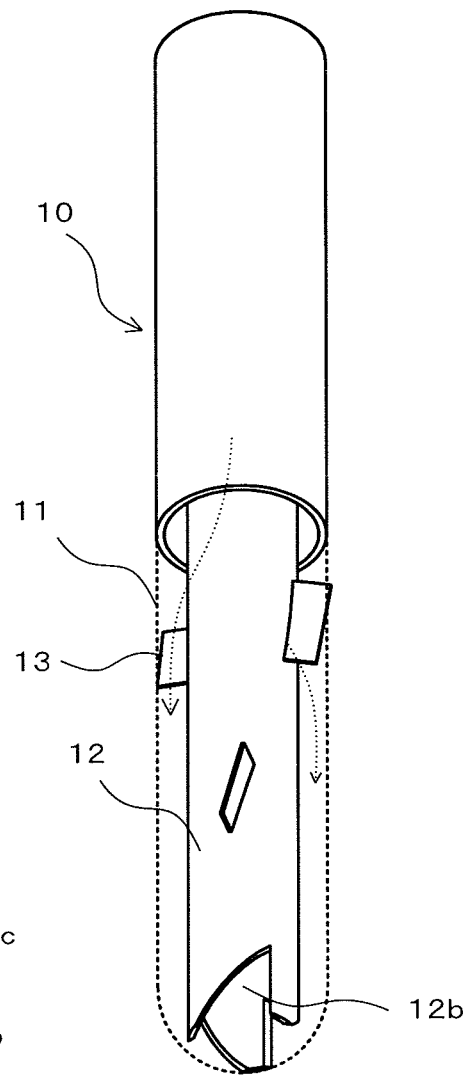
FIG. 6B is a partially transparent perspective view.
Figure 7:
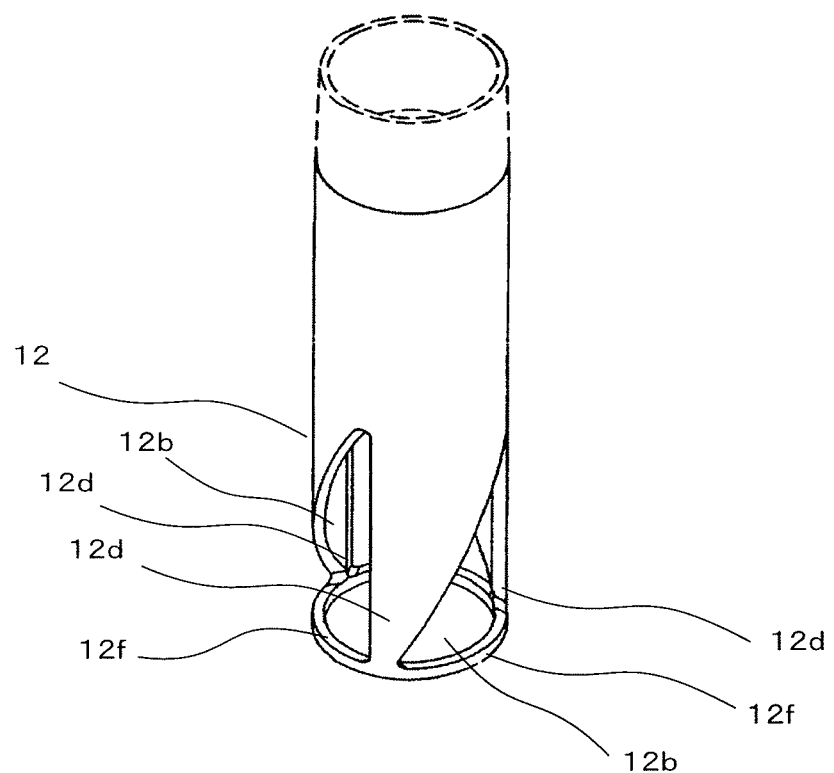
FIG. 7 is a perspective view which shows another embodiment of the liquid raising pipe 12 according to the first embodiment.

The lower end part of the liquid raising pipe 12 is open. While the opening portion of the distal end may be manufactured so as to have a circular cross section simply, it is preferable that the opening portion of the lower end liquid raising pipe 12a forming the bottom end of the liquid raising pipe 12 may be formed so as to have a cutout portion 12b, as shown in FIG. 5. By providing the cutout portion 12b, the liquid raising pipe 12 can be disposed directly on the bottom surface of the liquid lowering pipe 11, so that it becomes not necessary to suspend the liquid raising pipe 12 from the upper side. While the shape of the cutout portion 12b is not particularly limited, it is possible to cause the heat exchange liquid to flow so as to draw a spiral shape upward in the liquid raising pipe 12 by designing to change the velocity of the heat exchange liquid at which the lowering heat exchange liquid flows into the inner liquid raising pipe 12, as shown in FIG. 6. By adopting such a configuration, it is possible to reduce the disturbance of the flow of the heat exchange liquid by the friction loss due to the occurrence of turbulence and/or irregular vortexes in the liquid raising pipe 12. Specifically, in FIG. 6A, the liquid tries to flow into the inside of the liquid raising pipe 12 at a high pressure from the highest portion a of the cutout portion 12b, and at a low pressure from the lowest portion 13. Therefore, due to this pressure difference, the heat exchange liquid flows into spirally. While the cutout portion 12b may have any shape as long as it is asymmetrical, the cutout portion 12b having a side 12c having a gradient with respect to the horizontal plane is preferable in order to generate a stronger vortex. On the other hand, if both sides (12c, 12d) have a gradient, the flow is generated so as to draw a spiral that rotates in the opposite direction, so that it is preferable that one of the sides should be a vertical side (12d). Thus, as shown in FIG. 6A, it is preferable to form the cutout portion 12b of a right triangle. Of course, since it is a circular tube, the shape of the cutout portion 12b includes not only an exact triangle but also one which is shaped to be seen as a triangle when viewed. The side 12c having a gradient is not limited to a straight line and may be a curved line. Further, as shown in FIG. 7, a bridging member 12f may be provided so as to connect the tip pieces 12d constituting the cutout portion 12b with each other in order to maintain the strength of the tip of the liquid raising pipe 12. The bridging member 12f is preferably provided so as to form a ring shape with the tip piece 12d. By providing such a bridging member 12f, the possibility that the tip piece 12d is broken or bent can be reduced. Further, as shown in FIG. 5, the cutout portion 12b at the tip of the liquid raising pipe 12 may be provided as a detachable attachment type by screwing to be exchangeable.

As described above, since the cutout portion 12b is provided around the liquid rising pipe 12 having the tip provided with the cutout portion 12b, even when the liquid raising pipe 12 is disposed so as to be in contact with the bottom surface, the heat exchange liquid can be flowed from the liquid lowering flow region to the liquid rising flow region without any problems. Therefore, the liquid raising pipe 12 can be disposed so as to be in contact with the bottom surface inside the liquid lowering pipe 11.

Furthermore, straightening plates 13 for straightening may be provided on the outer periphery of the liquid raising pipe 12. If the straightening plates 13 are provided parallel to the axis of the liquid raising pipe 12, that is, in the vertical direction, the heat exchange liquid can be straighten so as to flow downward straightly. On the other hand, as shown in FIG. 5 and FIG. 6, by providing the straightening plates 13 in an oblique direction with respect to the axis of the liquid raising pipe 12, it is possible to flow the heat exchange liquid downward with rotating spirally. The straightening plates 13 may be manufactured to be flat or curved. By forming the width of the straightening plates 13 to be the same as that of the gap between the liquid raising pipe 12 and the liquid lowering pipe 11, the straightening plates 13 can be functioned as supporting members 15 (see FIG. 2) to maintain the relative position between the liquid raising pipe 12 and the liquid lowering pipe 11.

The outer thermal insulation pipe 40 is a pipe which is provided with a space on the outside of the liquid transport pipe 10 to form the outer thermal insulation layer 30 by air; in the first embodiment, the outer thermal insulation pipe 40 serves also as a casing. The outer thermal insulation pipe 40 is not particularly limited, and an ordinary oil well pipe or the like may be used. Since the outer thermal insulation layer 30 is for preventing the heat of the lowering heat exchange liquid from transferring into the ground, it is enough to be provided up to the point where the temperature of the lowering heat exchange liquid and the underground temperature become equal to each other. Below that point, it is more efficient not to provide the outer thermal insulation layer 30 because the heat is received as the geothermal heat.

The heat exchange liquid is, preferably, a low boiling point liquid whose boiling point is 150 degree Celsius or less at atmospheric pressure, for example, water, water in which ammonia is dissolved and so on.

The method of installing the geothermal heat exchanger 100 described above will be explained by taking the embodiment shown in FIG. 2 as an example. The description of the size or the length described below is merely an example, and not limited to the size or the length thereof. First, a well 85 is provided by excavating a place planned for a geothermal well. The well 85 is excavated so that the diameter of a well 85b which is provided in a location other than the geothermal zone becomes narrower than the diameter of a well 85a which is provided in the geothermal zone 80 in the underground. For example, a well 85b with a diameter of 35 cm is formed in a location other than the geothermal zone whose depth is as far as 500 m underground, and a well 85a with a diameter of 28 cm is formed in the geothermal zone 80 whose depth is from 500 m to 1500 m underground. At this time, the excavation is first carried out to the depth of 500 m underground, and then, an oil well pipe is disposed as the outer thermal insulation pipe 40 in the well 85a. An outer layer 88 into which fluidized soil, cement or urethane foam or the like is poured is provided between the outer thermal insulation pipe 40 and the well 85b to fix the outer thermal insulation pipe 40 and function as a further thermal insulation layer. And then, after the excavation of the well 85b up to the depth of 1500 m is completed, a support base 95 on which the liquid transport pipe 10 is placed is installed at the bottom of the well 85b. Then, after disposing the tip of the liquid raising pipe 12 having the cutout portion 12b formed on the lower end liquid lowering pipe 11c, the liquid lowering pipe 11 and the liquid raising pipe 12 are connected to each other, and the liquid transport pipe 10 is dropped into the well 85 while extending the length thereof. When the length reaches 1500 m, a flange member 70 is attached to the liquid lowering pipe 11. By that means, it is possible to prevent water or other substances from entering the outer thermal insulation layer 30 from the geothermal zone 80 or the non-geothermal zone into the outer thermal insulation layer 30. Further, the liquid lowering pipe 11 and the liquid raising pipe 12 are extended to be the liquid transport pipe 10 connected to the ground so that the geothermal heat exchanger 100 is completed. Besides, by providing flange members 70, flanges 73 may be provided between the lower liquid lowering pipe 11b and the well 85a or between the upper liquid lowering pipe 11a and the well 85b accordingly.

In the geothermal heat exchanger 100 manufactured by the method described above, the heat exchange liquid is pressurized by the high pressure pump 101 and supplied to the liquid lowering flow region 90. The pressurized heat exchange liquid descends through the liquid lowering flow region 90. The descending heat exchange liquid flows downward, being heated by the heat of the heated heat exchange liquid which flows upward in the liquid rising flow region 91 in a region other than the geothermal zone. During this period the outer thermal insulation layer 30 is installed on the outside of the liquid transport pipe 10, so that it is possible to reduce the conduction of the heat of the lowering heat exchange liquid to the underground to suppress the heat loss. As the heat exchange liquid further descends and approaches the geothermal zone 80, and the temperature of the heat exchange liquid and the temperature of the geothermal zone 80 become approximately the same. Since the outer thermal insulation layer 30 is no more installed in the vicinity of this point, the heat exchange liquid thereafter descends while being heated by the heat of the geothermal zone 80. Then, at the bottom end part, the heat exchange liquid moves from the liquid lowering flow area 90 to the liquid rising flow area 91 and changes the flow direction upward. At this time, the heat exchange liquid is heated up to the temperature equal to or higher than the boiling point under atmospheric pressure. Preferably, it is 250 degree Celsius or higher. Then, as described above, the heat exchange liquid flows upward while transferring a part of the heat to the descending heat exchange liquid by heat conduction through the liquid raising pipe 12. At this time, by adjusting the pressure to be loaded, the heat exchange liquid maintains a state of the high temperature and the high pressure at least until it is extracted through the liquid raising pipe 12 from the lowest end part, and can be extracted under a single phase state without containing vapor at the top end.

As described above, the heated heat exchange liquid is extracted and then decompressed by a steam generator 102, and the high temperature and high pressure steam is generated to be used for power generation.

If the heat exchange liquid is extracted under a single phase state with high temperature and high pressure by means of the geothermal heat exchanger 100 according to the present invention, it is possible to efficiently obtain the single phase steam from the single phase heat exchange liquid by setting of the steam generator 102. Therefore, it is possible to perform the heat exchange with a high capacity and an excellent thermal efficiency. It should be understood that the extraction of a single phase steam enables the turbines 104 to be efficiently moved without installing a steam-water separator at a stage before being introduced into the turbines 104. Of course, a steam-water separator may be provided to improve the efficiency more. Since the heat transfer coefficient of a single-phase liquid flow is smaller compared to that of a gas-liquid two-phase flow, it is possible to improve the thermal efficiency when the heat received from the geothermal zone 80 is transported to the ground.

Furthermore, in the case of flowing the heat transfer liquid as a gas-liquid two-phase flow in the geothermal heat exchanger 100, the flow has a very complicated flow characteristic and a heat transfer characteristic, and the behavior of the gas-liquid two-phase flow becomes complicated and instable when the underground pressure is loaded on it in the deep underground; the flow can be more stable if a single-phase flow is applied. Particularly, in the geothermal heat exchanger 100 according to the present embodiment having a very long flow path and being configured to be a double-pipe or triple-pipe structure, there is a possibility that vibrations due to the vapor of the gas-liquid two-phase flow may become a problem. By applying the single-phase flow, not only the possibility of this problem can be reduced, but also the damage of the geothermal heat exchanger 100 can be reduced.

According to the geothermal heat exchanger 100 in the present embodiment, for example, for a geothermal well having a depth of 800 m and the geothermal zone whose temperate is 250 degree Celsius, it is calculated that the pressure, the volumetric flow rate and the temperature of the obtained water is 0.79 MPa, 35.20 m$^2$/h, and 185 degree Celsius, respectively, and a generator with a generating capacity of approximately 80 KW can be operated in the case that the geothermal heat exchanger 100 having the double pipes of the liquid lowering pipe 11 with an inner diameter of 250 mm and the liquid raising pipe 12 with an inner diameter of 200 mm, and the outer thermal insulation pipe with a diameter of 300 mm which forms the thermal insulation layer enclosing air, and in the case that the water is used as the heat exchange liquid under the condition that the pressure is 1.2 MPa, the volumetric flow rate is 35.20 m$^2$/h and the temperature is 145 degree Celsius.

Figure 8:
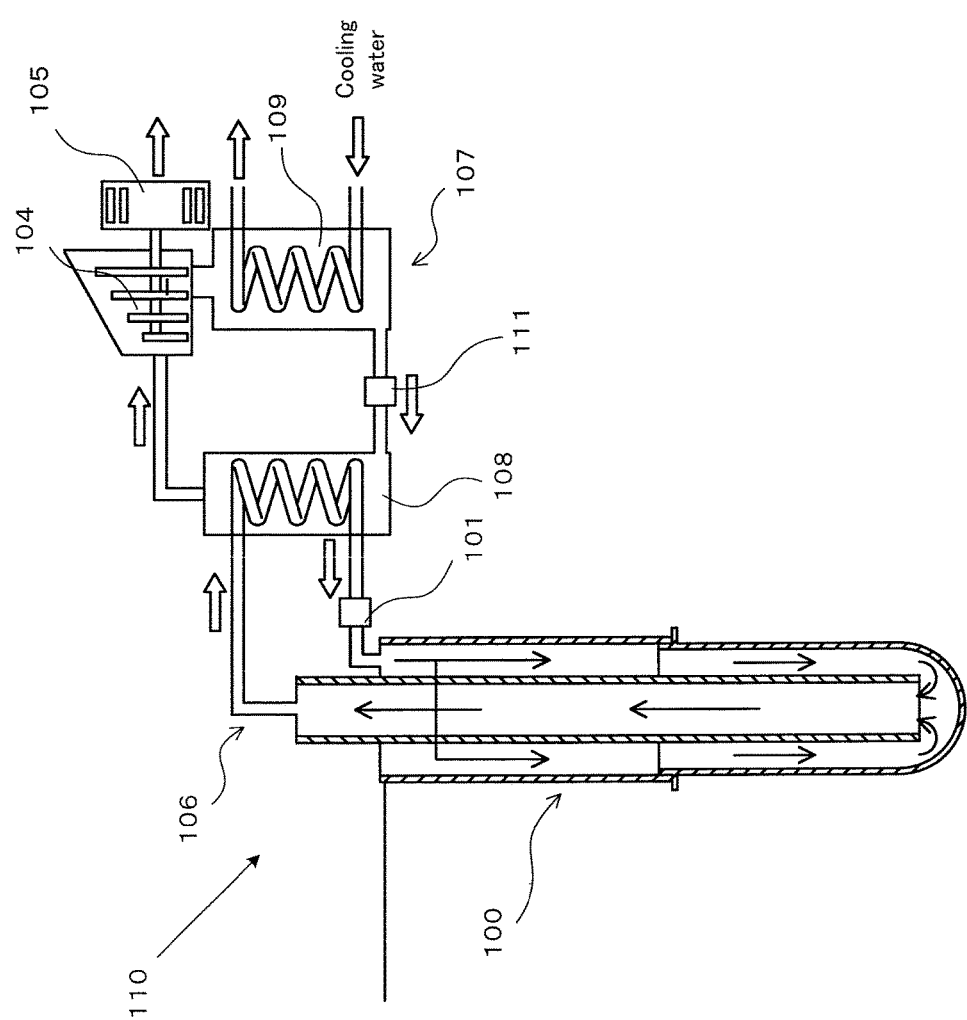
FIG. 8 is a schematic diagram which shows an example in which the geothermal heat exchanger 100 according to the first embodiment is applied to a binary power generation.

Furthermore, in the embodiment described above, while the method of extracting a single-phase high-temperature and high-pressure heat exchange liquid directly as steam has been explained as an example, the geothermal heat exchanger according to each embodiment may be a binary-type geothermal power generation facility. The binary-type, in which a low boiling point medium having a boiling point lower than that of the heat exchange liquid is heated and vaporized to rotate the turbine by the steam, has two heat cycles: the cycle for the heat exchange liquid and the cycle for the low boiling point medium. Specifically, as shown in FIG. 8, it has a heat exchange liquid circulation cycle 107 in which a heat exchange liquid circulates, and a low boiling medium circulation cycle 108. In the heat exchange liquid circulation cycle 107, the heat exchange liquid is circulated mainly between the geothermal heat exchanger 100 and an evaporator 108 heating the low boiling point medium, by a high pressure pump 101. In the low boiling point medium circulation cycle 108, the low boiling point medium is heated by the evaporator 108 to generate steam, the turbines 104 is rotated by the obtained steam, and electricity is generated by a power generator 105. The low boiling point medium used for the power generation is cooled by a condenser 109 and delivered again to the evaporator by a circulation pump 111.

Even in such a binary-type system, in the present embodiment, water in the underground is not contained in both the heat exchange liquid and the low boiling point medium, so that impurities such as scales are not included therein. Therefore, the necessity of the maintenance of the entire apparatus can be reduced, and the service life of the equipment can be extended.

Even in the binary power generation, similar to the case of obtaining steam directly as described above, it is possible to obtain the effect of stabilizing the behavior and the effect of improving the thermal efficiency as compared with the case of flowing in the gas-liquid two-phase flow.

In the first embodiment described above, the outer thermal insulation layer 30 is an thermal insulation layer by an air layer in a space formed by the pipe, however, the gas inserted into the inside may be other than air, such as nitrogen gas or the like. In addition, the following methods may be adopted: a method of making the space between the liquid transport pipe 10 and the outer thermal insulation pipe 40 low-pressure or vacuum; a method of enclosing a thermal insulation gas such as pressurized nitrogen, air or the like in a space between the liquid transport pipe 10 and the outer thermal insulation pipe 40; a method of inserting liquid or solid thermal insulation materials. In particular, when adopting the method of enclosing the pressurized thermal insulation gas, a geothermal pressure from the geothermal zone 80 is applied to the outer thermal insulation pipe 40 and the inner liquid raising pipe 11 is pressured by the heat exchange liquid pressurized by the pump; a force offsetting these pressures can be given by the pressurized thermal insulation gas. Therefore, as compared with the case that a non-pressurized gas is inserted, the pipe thickness of the outer thermal insulation pipe 40 or the liquid lowering pipe 11 can be made thinner. Preferably, a pressurized thermal insulation gas with a pressure greater than 1.0 atm but 3.0 atm or less, more preferably between 1.2 atm and 2.0 atm may be inserted.

Figure 9:
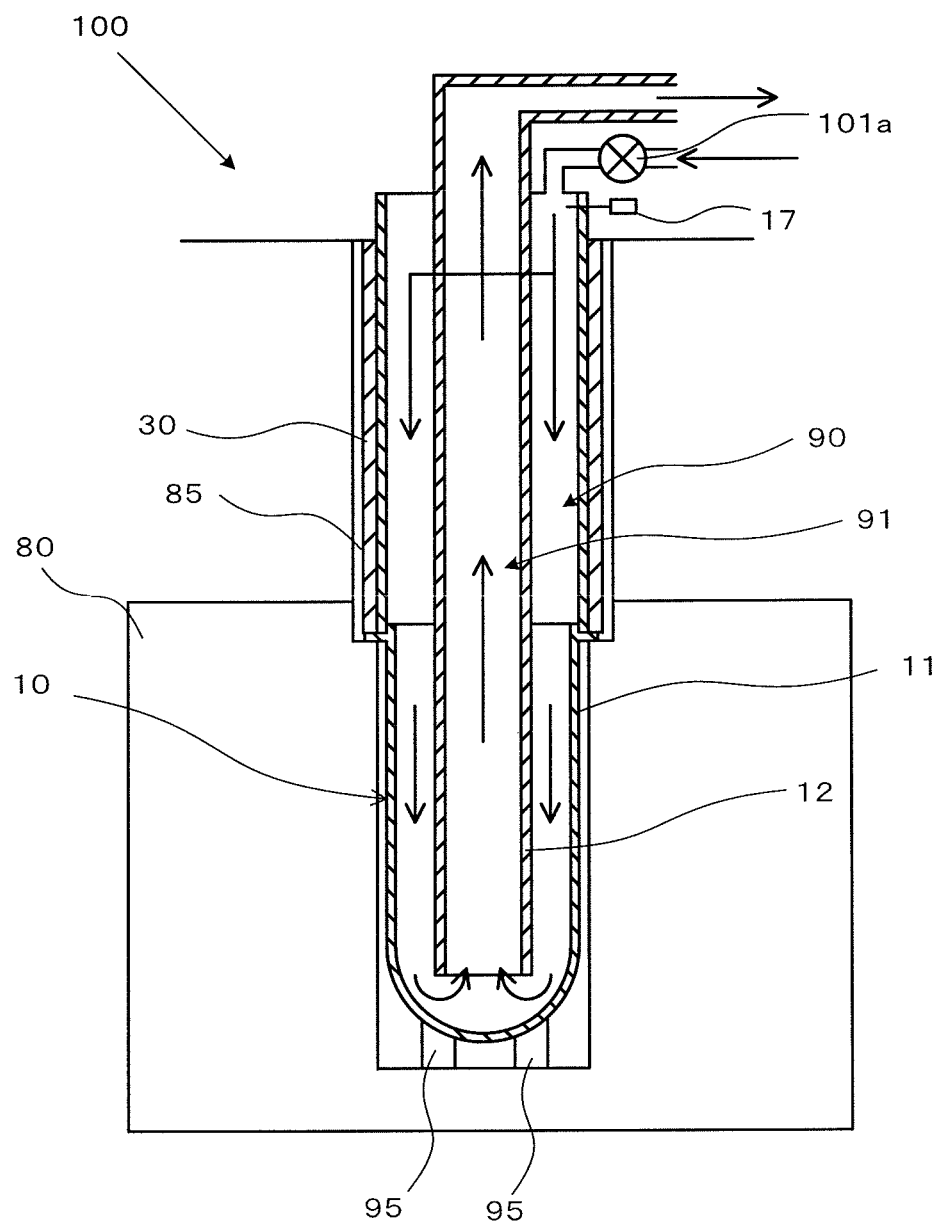
FIG. 9 is a cross-sectional view which shows another embodiment of the geothermal heat exchanger 100 according to the first embodiment.

Furthermore, in the first embodiment, while the outer thermal insulation pipe 40 is provided and the thermal insulation layer is provided by forming the double-pipe structure with the liquid lowering pipe 11, as shown in FIG. 9, a thermal insulation material may be provided on the outside of the pipe before the pipe is installed. As a method of providing the thermal insulation material on the outside of the pipe, for example, the following examples may be adopted: a method of wrapping with or adhering a sheet-shaped thermal insulation material, a method of directly covering the liquid transport pipe 10 by spraying or coating with a thermal insulation material, and so on. As the method of wrapping with a thermal insulation material among the methods of covering the liquid transport pipe 10 with the thermal insulation material, it is considered to wrap with the sheet-shaped thermal insulation material such as, a heat-resistant polyimide sheet, a sheet made of glass fiber or ceramic fiber, a GUNZE ECO COVER (manufactured by GUNZE ENGINEERING CO., LTD.), or the like. As a method of spraying or coating with a thermal insulation material, for example, it is considered to coat with a mortar or the like, or to spray with a heat-resistant material which is obtained by bonding alumina fibers or ceramic fibers with alumina, alumina cement or the like. Of course, the methods are not limited to these.

Second Embodiment

Figure 10:
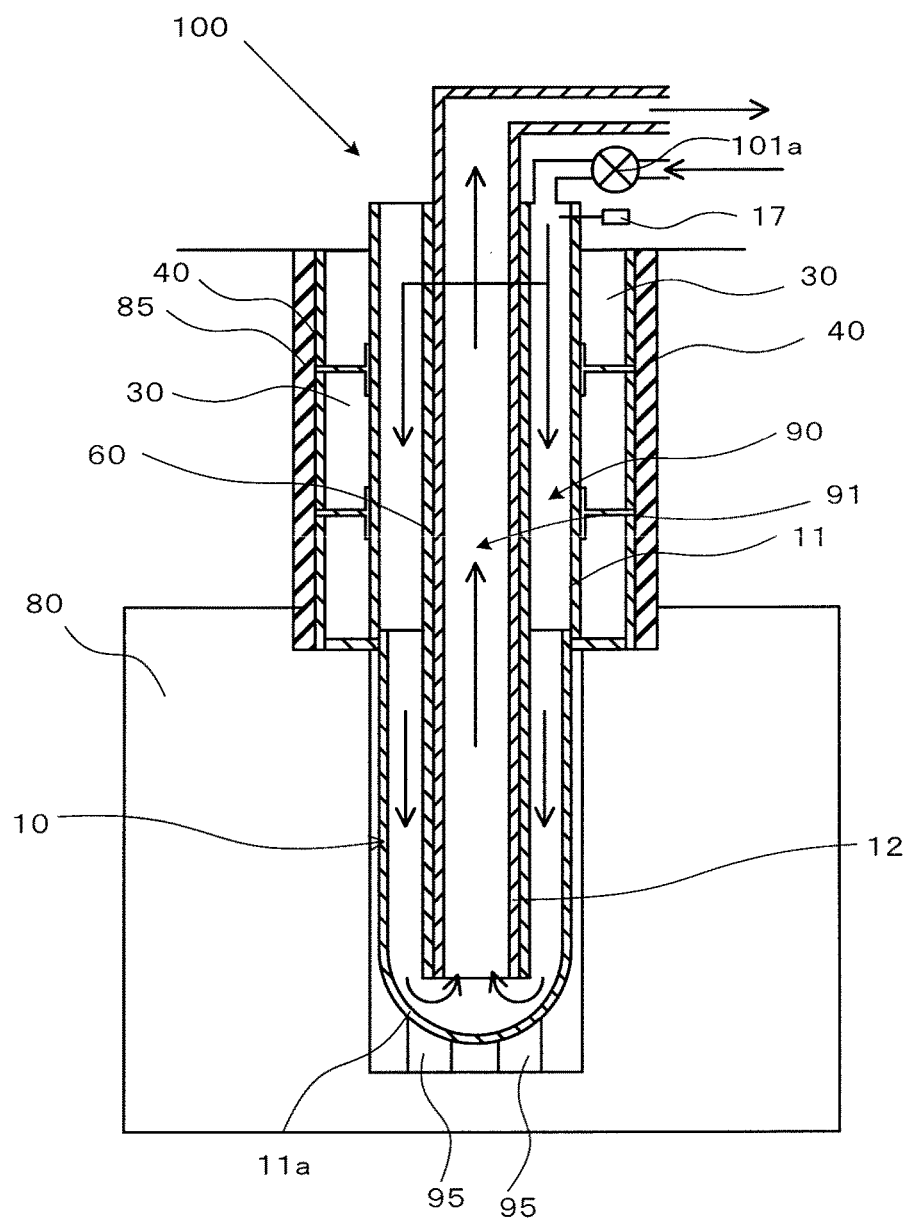
FIG. 10 is a cross-sectional view of a geothermal heat exchanger 100 according to a second embodiment.
Figure 11:
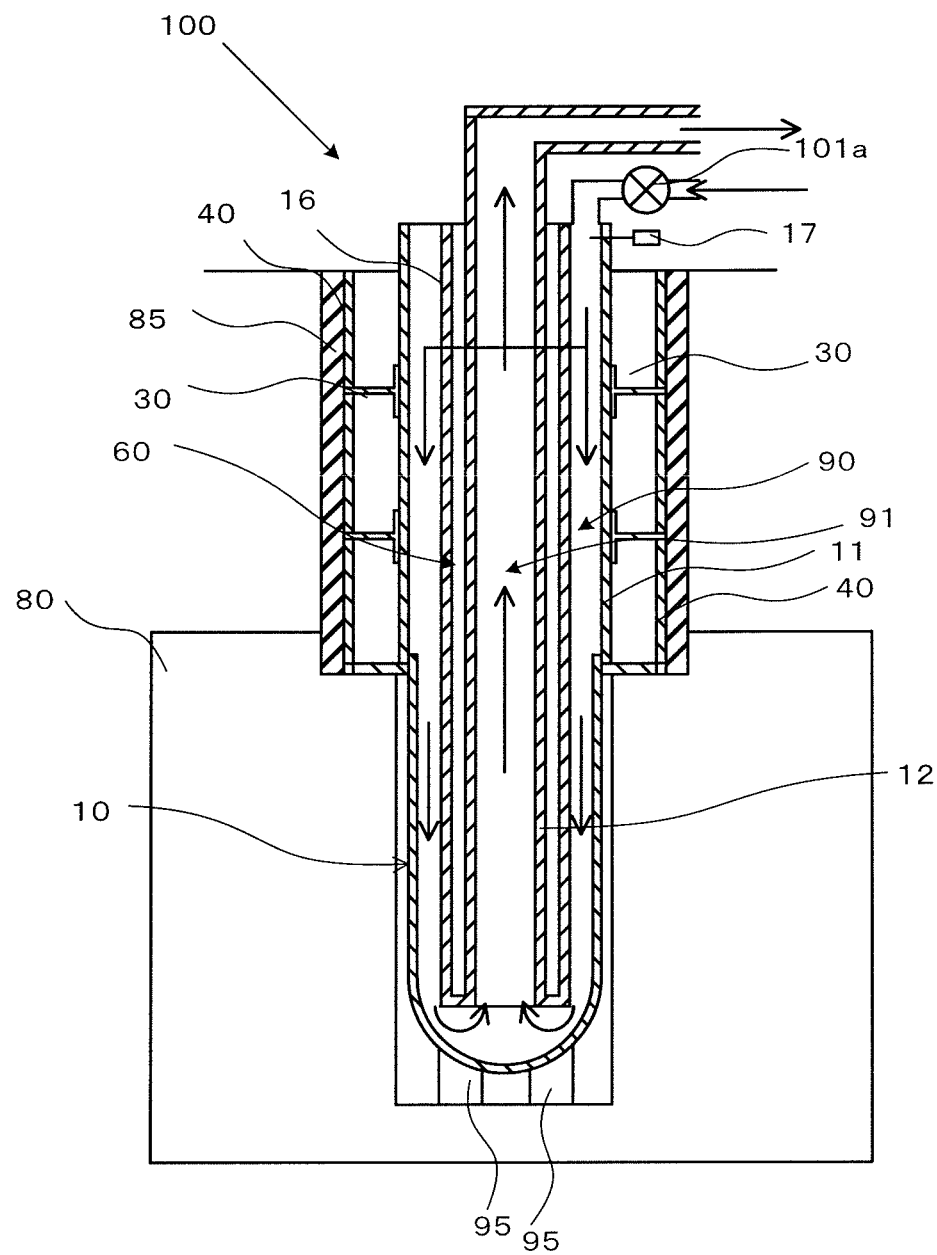
FIG. 11 is a cross-sectional view which shows another embodiment of the geothermal heat exchanger 100 according to the second embodiment.

The geothermal heat exchanger 100 according to the second embodiment is shown in FIG. 10 and FIG. 11. FIG. 10 and FIG. 11 are cross-sectional views of the geothermal heat exchanger 100 according to the second embodiment.

The geothermal heat exchanger 100 according to the second embodiment is different from that of the first embodiment in the points that the inner thermal insulation layer 60 is provided between the liquid lowering flow area 90 and the liquid rising flow area 91. As the other points are the same as those of the first embodiment, the description thereof will be omitted.

The inner thermal insulation layer 60 is a thermal insulation layer formed on the outside of the liquid raising pipe 12. As a method of manufacturing the thermal insulation layer, as shown in FIG. 10, it is considered that a method of wrapping with a sheet-shaped thermal insulation material. As to the thermal insulation sheet to be used, the same one as the outer thermal insulation layer 30 can be used; however, the resistance against the flowing heat exchange liquid is necessary. In addition, as shown in FIG. 11, the inner thermal insulation pipe 16 may be provided on the outside of the liquid raising pipe 12 to form the liquid transport pipe 10 having a quadruple-pipe structure as a whole. The inner thermal insulation layer 60 between the liquid raising pipe 12 and the inner thermal insulation pipe 16 is formed in a closed system which is a different system from the liquid lowering flow region 90 and the liquid rising flow region 91. The above-described thermal insulation material may be inserted into this inner thermal insulation layer 60, or may be formed to be vacuum or low-pressure. Further, it may be possible to seal a thermal insulation gas such as air, nitrogen gas or the like, with or without pressurization. Since the pressure of the descending heat exchange liquid is applied to the inner thermal insulation pipe 16 and the pressure of the ascending heat exchange liquid is applied to the liquid raising pipe 12, it is possible to give the force to offset these pressures if the pressurized thermal insulation gas is sealed. Therefore, as compared with the case when a non-pressurized gas is inserted, the pipe thickness of the outer thermal insulation pipe 40 or the liquid lowering pipe 11 can be made thinner. Preferably, a pressurized insulation gas at 1.0 atm to 3.0 atm, more preferably 1.2 atm to 2.0 atm at the ground surface is inserted.

By providing the inner thermal insulation layer 60, the conduction of the heat of the ascending heat exchange liquid to the descending heat exchange liquid can be suppressed considerably low. As it is impossible to completely insulate the heat loss in reality, some of the amount of heat will be transferred to the descending heat exchange liquid. However, since the outer thermal insulation layer 30 is provided on the outside of the liquid transport pipe 10, it is possible to reduce the heat conduction of the descending heat exchange liquid to the non-geothermal zone, and to suppress the heat loss.

Third Embodiment

Figure 12:
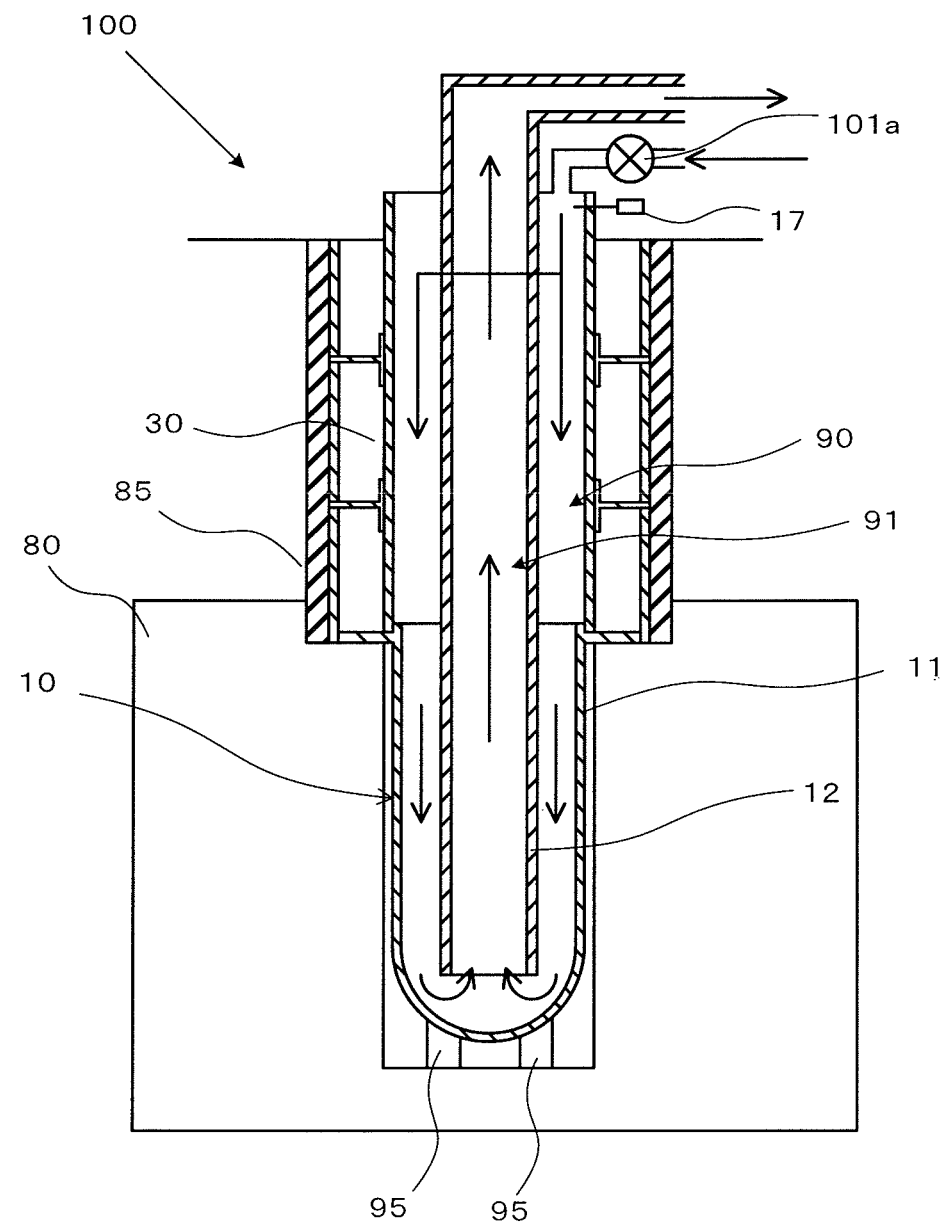
FIG. 12 is a cross-sectional view of a geothermal heat exchanger 100 according to a third embodiment.

The geothermal heat exchanger 100 according to the third embodiment is shown in FIG. 12. FIG. 12 is a cross-sectional view of the geothermal heat exchanger 100 according to the third embodiment. The geothermal heat exchanger 100 according to the third embodiment has a double-pipe structure in which the liquid lowering pipe 11 and the liquid raising pipe 12 are arranged in the opposite order to those of the geothermal heat exchanger 100 according to the first embodiment. That is, the liquid raising pipe 12 is disposed outside and the liquid lowering pipe 11 is disposed inside. In the liquid transport pipe 10, at the lowest end part the liquid lowering pipe 11 and the liquid raising pipe 12 are connected with each other. And the pressurized heat exchange liquid flows downward while being heated by the geothermal zone 80 through the liquid lowering flow region 90 formed between the outer liquid lowering pipe 11 and the liquid raising pipe 12. At the lowest end, the heated heat exchange liquid flows into the liquid rising flow area 91 inside of the liquid raising pipe 12 and flows upward up to be transported to the ground. The other parts of the configuration are the same as that in the first embodiment.

In the third embodiment, since the heated heat exchange liquid rises in the outer side, it is more susceptible to underground heat in the non-geothermal zone, and the outer thermal insulation layer 30 according to the present embodiment can work more effectively.

It should be understood that the present invention is not limited to the above-described embodiments at all and can be implemented in various aspects as long as it belongs within the technical scope of the present invention.

INDUSTRIAL APPLICABILITY

The present invention can be utilized as a heat exchanger for geothermal power generation as shown in the above embodiments.

DESCRIPTION OF REFERENCE NUMERALS

10: liquid transport pipe,
11, 11a, 11b: liquid lowering pipe,
11c: lower end liquid lowering pipe,
12: liquid raising pipe,
12a: lower end liquid raising pipe,
12b: cutout portion,
12c: side,
13: straightening plate,
15: supporting member,
16: inner thermal insulation pipe,
17: sensor,
30: outer thermal insulation layer,
40: outer thermal insulation pipe,
60: inner thermal insulation layer,
70: flange member,
71: fitting portion,
73: flange,
80: geothermal zone,
85, 85a, 85b: well,
88: outer layer,
90: liquid lowering flow region,
91: liquid rising flow region,
95: support base,
100: geothermal heat exchanger,
101: high pressure pump,
102: steam generator,
103: heater,
104: turbines,
105: power generator,
106: condenser,
110: geothermal power generation facility

The invention claimed is:

1. A geothermal heat exchanger installed in a geothermal zone, comprising:
   a liquid transport pipe provided with a liquid lowering pipe which lowers a supplied heat exchange liquid which is pressurized, and a liquid raising pipe which is disposed inside or outside of the liquid lowering pipe and raises the heat exchange liquid which has descended to the geothermal zone and has been heated by heat thereof of the geothermal zone, and
   an outer thermal insulation layer which is provided on a part or the whole of the outside of the liquid transport pipe at least from a ground surface to the geothermal zone,
   wherein a cutout portion is provided, in the liquid transport pipe, a side of the cutout portion comprises a vertical side wall on the lower end part of the pipe that is the internally positioned pipe of the liquid lowering pipe or the liquid raising pipe,
   and wherein the cutout portion is asymmetrical about a central longitudinal axis of the geothermal heat exchanger.

2. The geothermal heat exchanger according to claim 1, wherein the cutout portion comprises plural cutout portions each having a tip piece and is provided with a bridging member that connects the tip pieces.

3. The geothermal heat exchanger according to claim 1, wherein
   an outer thermal insulation pipe is disposed outside of the liquid transport pipe, and the outer thermal insulation layer is a space provided between the liquid transport pipe and the outer thermal insulation pipe.

4. The geothermal heat exchanger according to claim 3, wherein
   a gas with a pressure of 1.0 atm to 2.0 atm is enclosed in the outer thermal insulation layer.

5. The geothermal heat exchanger according to claim 3, wherein
   the outer thermal insulation layer is configured to have low-pressure or a vacuum.

6. The geothermal heat exchanger according to claim 3, wherein
   a thermal insulation material is enclosed in the outer thermal insulation layer.

7. The geothermal heat exchanger according to claim 1, wherein
   the outer thermal insulation layer is provided with a thermal insulation material which is directly provided on the outer periphery of the liquid transport pipe.

8. The geothermal heat exchanger according to claim 1, wherein
   an inner thermal insulation layer is provided between the liquid lowering pipe and the liquid raising pipe.

9. The geothermal heat exchanger according to claim 8, wherein the inner thermal insulation layer is provided between an inner thermal insulation pipe which is outside of the liquid raising pipe, and the liquid raising pipe, and the inside of the inner thermal insulation pipe is configured to have low pressure or a vacuum.

10. The geothermal heat exchanger according to claim 8, wherein
the inner thermal insulation layer is provided between an inner thermal insulation pipe which is outside of the liquid raising pipe, and the liquid raising pipe, and a gas having a pressure of 1.0 atm to 2.0 atm is provided in the inner thermal insulation pipe.

11. The geothermal heat exchanger according to claim 1, wherein
flanges are provided on the outer periphery of the liquid transport pipe.

12. A geothermal power generation facility, comprising:
the geothermal heat exchanger according to claim 1, a high-pressure pump, a steam generator, and a power generator.

13. A geothermal power generation method using the geothermal power generation facility according to claim 12, comprising:
(1) introducing, by the high pressure pump, a high-pressure heat exchange liquid into the geothermal heat exchanger,
(2) extracting the heat exchange liquid heated by geothermal heat in a single phase state while passing through the geothermal heat exchanger,
(3) obtaining, by the steam generator, steam from the extracted heat exchange liquid and,
(4) rotating turbines of the power generator by the steam obtained by the steam generator.

14. A liquid transport pipe used in a geothermal heat exchanger installed in a geothermal zone, comprising:
a liquid lowering pipe in which the pressurized heat exchange liquid is supplied and descends,
a liquid raising pipe which is disposed on an inside or on an outside of the liquid lowering pipe and raises the descended heat exchange liquid, and
an outer thermal insulation layer which is provided on the outside of the liquid lowering pipe or the liquid raising pipe
wherein a cutout portion is provided in the liquid transport pipe, a side of the cutout portion comprises a vertical side wall on the lower end part of the pipe that is the internally positioned pipe of the liquid lowering pipe or the liquid raising pipe, and
wherein the cutout portion is asymmetrical about a central longitudinal axis of the liquid transport pipe.

15. The liquid transport pipe according to claim 14, wherein
the outer thermal insulation layer is a space provided by an outer thermal insulation pipe on the outer side.

16. The liquid transport pipe according to claim 15, wherein
the outer thermal insulation pipe has hermeticity so that the inside has a low-pressure or a vacuum, or encloses a gas layer having a pressure of 1.0 atm to 3.0 atm.

17. The liquid transport pipe according to claim 15, wherein
the outer thermal insulation layer comprises a thermal insulation material enclosed in a space provided by the outer thermal insulation pipe.

18. The liquid transport pipe according to claim 14, wherein the outer thermal insulation layer is a thermal insulation material.

19. The liquid transport pipe according to claim 14, wherein
a thermal insulation material is disposed on the outside of the internally positioned pipe of the liquid raising pipe or the liquid lowering pipe.

20. The liquid transport pipe according to claim 19, wherein
an inner thermal insulation pipe is disposed outside of the internally positioned pipe of the liquid raising pipe or the liquid lowering pipe.

21. The liquid transport pipe according to claim 19, wherein
the inner thermal insulation pipe has hermeticity so that the inside has a low-pressure or a vacuum, or encloses a gas layer having a pressure of 1.0 atm to 3.0 atm.

22. The liquid transport pipe according to claim 14, wherein
flanges are provided on the outer periphery of the liquid lowering pipe or the liquid raising pipe.

23. A liquid raising pipe which is a part of a liquid transport pipe used in a geothermal heat exchanger installed in a geothermal zone, the liquid raising pipe disposed inside of a liquid lowering pipe for lowering a heat exchange liquid, the liquid raising pipe raising the heat exchange liquid moved from the liquid lowering pipe through an open lower end part of the liquid raising pipe,
wherein a cutout portion is provided in the liquid raising pipe a side of the cutout portion comprises a vertical side wall provided at the lower end part of the liquid raising pipe, and wherein the cutout portion is asymmetrical about a central longitudinal axis of the liquid raising pipe.

24. The liquid raising pipe according to claim 23, wherein
the cutout portion comprises a plurality of cutout portions, and
a lower end part of the liquid raising pipe has a bridging member between the plurality of cutout portions.

25. The liquid raising pipe according to claim 24, wherein
straightening plates are provided on the outer periphery of the liquid raising pipe.

26. The liquid raising pipe according to claim 25, wherein
the straightening plates are provided parallel to the axial direction of the liquid raising pipe.

27. The liquid raising pipe according to claim 25, wherein
the straightening plates are provided obliquely with respect to the axial direction of the liquid raising pipe.

28. The liquid raising pipe according to claim 25, wherein
the straightening plates comprise support members that support the liquid raising pipe.

29. A liquid transport pipe comprising the liquid raising pipe according to claim 23 and a liquid lowering pipe positioned outside of the liquid raising pipe, wherein
a bottom surface part of the liquid lowering pipe has a hemispherical shape or a semi-elliptic spherical shape.

30. The geothermal heat exchanger according to claim 1, wherein
a cross-sectional area of a liquid rising flow region is equal to or smaller than a cross sectional area of a liquid lowering flow region.

31. The liquid transport pipe according to claim 14, wherein
the cutout portion comprises plural cutout portions and is provided with a bridging member that connects tip pieces constituting the plural cutout portions.

32. The liquid transport pipe according to claim 14, wherein
a cross-sectional area of a liquid rising flow region is provided so as to be equal or smaller than a cross sectional area of a liquid lowering flow region.

* * * * *